INVENTOR.
Wallace H. Buswell
BY
Edward E. Schilling
ATTORNEY

INVENTOR.
Wallace H. Buswell
BY
Edward E. Schilling
ATTORNEY

INVENTOR.
Wallace H. Buswell
BY
Edward E. Schilling
ATTORNEY

United States Patent

Re. 28,446

Reissued June 10, 1975

28,446

ECCENTRIC ACTING FLOAT-CONTROLLED PINCH-VALVE VESSEL FILLING ASSEMBLY

Wallace H. Buswell, Beaverton, Mich., assignor of fractional part interest to Clare C. Anderson, Midland, Mich.

Original No. 3,670,751, dated June 20, 1972, Ser. No. 117,301, Feb. 22, 1971. Application for reissue June 13, 1974, Ser. No. 478,950

Int. Cl. G05d *9/02*

U.S. Cl. 137—1 31 Claims

Matter enclosed in heavy brackets [ ] appears in the original patent but forms no part of this reissue specification; matter printed in italics indicates the additions made by reissue.

ABSTRACT OF THE DISCLOSURE

An eccentric acting float-controlled pinch-valve vessel filling mechanism utilizes as flow control means, in combination, (1) a delivery tube having a free end portion and an attached end portion coupled to downwardly extending liquid supply means and an intermediate flexible portion adjacent the attached end capable of being repeatedly flexed sufficiently to shut off the flow of liquid therethrough, and (2) fixedly associated with the delivery tube adjacent the flexible portion and between such portion and the mid-length of the free end portion of the tube, a critically shaped float having substantially an L-shape, being formed with two body portions that join at an angle of about 90°, such joinder being adjacent the association with the delivery tube, the free end portion of the delivery tube extending along a line between the respective longitudinal axes of the two body portions of the float and substantially in the same plane therewith. As an essential feature, the float is disposed, with respect to the delivery tube, e.g., when in an empty vessel, so that rising liquid buoys up the then depending body portion of the float and moves it slightly in a direction opposite to subsequent motion and temporarily locks it against adjacent stop means and keeps the flexible portion of the delivery tube open until the liquid level reaches the then substantially horizontal other body portion whereupon the buoyancy of this latter body portion soon abruptly moves the float out of the locked position and the buoyancy of the formerly dependent body portion is added to that of the second body portion and eccentrically pivots the float and the delivery tube about the point of flexing of the delivery tube and thereby abruptly pinches shut the passageway in the delivery tube, stopping delivery of liquid therethrough until the occasion when the vessel is again drained, when the float again falls temporarily into the dependent and then locked positions during filling of the vessel.

*As a sub-combination of a float-controlled pinch-valve vessel filling assembly, a delivery tube having a flexible portion serving as the pinch valve and being formed of elastomeric material and having a permanent partial restriction produced under heating and deformative pressure whereby the flexible portion flexes repetitively in the same plane. In some embodiments the flexible portion is provided with one or more longitudinal ribs or thickened wall portions to assure the repetitive flexing in the same plane.*

BACKGROUND OF THE INVENTION

1. Field of the Invention

The invention relates to an eccentric acting floatcontrolled pinch-valve vessel filling assembly and more particularly to such an assembly utilizing a delivery tube having a non-metallic flexible portion capable of being flexed sharply enough to shut off the flow of liquid therethrough by the action of a float associated therewith.

2. Description of the Prior Art

Heretofore water closets and the like have been controllably filled and refilled utilizing a standard gate valve actuated by a float which, in effect, signals the reaching of a pre-determined liquid level in the vessel being filled. Such valves are usually made entirely of metal and require metal working operations for their manufacture and are thus an item of ever increasing cost. Such valves are fairly long lasting when properly made and installed, but are subject to wear and corrosion and partial plugging by hardness. Partial plugging includes interference with complete shut-off whereupon there may be a steady leakage of liquid through the valve making undesirable noise and allowing wastage of the liquid.

Attempts have been made to provide vessel filling assemblies utilizing non-metallic valves, i.e., pinch valves, but in each case no provision appears to have been made to assure flexing of the flexible delivery tube in a truly fixed plane, and especially lacking is any attempt to obtain a sharp or eccentric cut off of liquid flow through the flexible tube portion when the vessel becomes filled to a pre-determined level.

For the purposes of the following description and the appended claims the term pinch-valve means a valve formed of a flexible, liquid-conducting, elastomeric tube capable of being flexed sharply enough to shut off the flow of liquid therethrough, and associated therewith, means for flexing the tube to achieve shut-off when liquid has flowed into the vessel being filled and brought the liquid level to a predetermined depth. While the valve has no metallic body or housing as is found in the typical mechanical valve and may be referred to as a non-metallic valve, the actuating float therefor may be formed of foamed light weight metal or be an enclosed hollow light gauge metal vessel, if desired.

OBJECTS OF THE INVENTION

It is a principal object of the invention to provide a float-controlled pinch-valve vessel filling mechanism that is eccentric acting, low cost, long lasting and reliable.

Another object of the invention is to provide a low cost quiet quick-filling long lasting valve assembly for controlling the filling of water closets and the like.

Still another object of the invention is to provide a method of eccentrically shutting off a pinch-valve when a vessel has been filled to a pre-determined level.

These and other objects and advantages of the assembly of the invention will be more clearly understood by those skilled in the art upon becoming familiar with the following description, reference being had to the appended drawings.

STATEMENT OF THE INVENTION

The float-controlled pinch-valve vessel filling device of the invention is utilized in combination with a vessel to be controllably filled with a liquid to a predetermined filled level, the vessel having defining walls and controllable liquid emptying means, and comprises (1) a liquid supply conduit positioned to deliver liquid inside the vessel, said supply conduit having a terminal portion positioned above the pre-determined filled level and extending approximately vertically downward towards said filled level; (2) delivery tube means having one end portion coupled to the terminal end of said liquid supply conduit, and, communicating therewith, a second dependent portion terminating in a free distal end, and a third portion cojoining the first and second portions and being flexible and adapted to prevent liquid flow therethrough by its internal cross-section becoming substantially zero when flexed to form an included angle generally less than about 9° between the first and second portions, said second portion, when the delivery tube is hanging in air, under no external stress, extending along a line diverging from the vertical downward direction; (3) buoyant float means associated with and attached to said delivery tube means between the point of flexing, in the third portion, and the mid-length of the distal end portion; and (4) stop means restricting the pivotal movement of the buoyant float means and associated delivery tube means about the point of flexing when the delivery tube means depends downwardly when the vessel is in a substantially empty condition prior to filling and the associated float and delivery tube means are in filling position; the buoyant float means being buoyant in, substantially impervious to, and substantially unattacked chemically by, said liquid; the buoyant float means being shaped with first and second slightly elongated body portions each having a longitudinal axis and each having an end co-joined at about an angle of about 90° between said axes with the end of the second body portion overlapping the end of the first body portion by about one-fourth to one-third the transverse width of said first body portion, the second body portion having a side extension adjacent its free end, the side extension projecting from the side opposite the side to which the first body portion is joined, the second body portion having sufficient buoyancy to overcome both jet action of liquid issuing from the distal end during filling of the vessel and the horizontal component of the buoyancy force on the first body portion in a temporarily locked position against the stop means, i.e., after the liquid level has reached the second body portion; the delivery tube means being substantially coplanar therewith and attached to the buoyant float means and extending along a line adjacent the intersection of the body portions and extending between the free ends thereof at an angle between at least 15° to the longitudinal axis of the first body portion and at least 30° to the longitudinal axis of the second body portion and attachment to the float means being at a point along the delivery tube means whereby upon such tube means depending downwardly along the said line diverging from the vertical, the longitudinal axis of the second body portion is at approximately the height of the pre-determined filled level; and the stop means being positioned acccording to the combination of factors (a) the relative lateral position of the vertically downward extending portion of the supply conduit, (b) the thickness dimensions of the first body portion of the buoyant float means, and (c) the angle between the second portion of the delivery tube means and the body portions of the buoyant float means, whereby in the assembly, prior to filling the vessel when the second portion of the delivery tube means depends downwardly and the first body portion of the buoyant float means is pushed against the stop means by the substantially horizontally acting forces of the initial flow of filling liquid from the delivery tube means and the buoyancy of the first body portion, the longitudinal axis of the first body portion extends, at the bottom end of said portion, away from a line drawn vertically downward from said downward extending portion of the supply conduit and toward the stop means so that from about 85 to 95 percent of the lower end face of the first body portion lies between the stop means and said vertical line, while the second portion of the delivery tube means diverges away from said stop means and depends at an angle of from about 10° to about 55° with respect to the line drawn vertically downward.

THE DRAWINGS

BRIEF DESCRIPTION OF THE INVENTION

Figure 1:
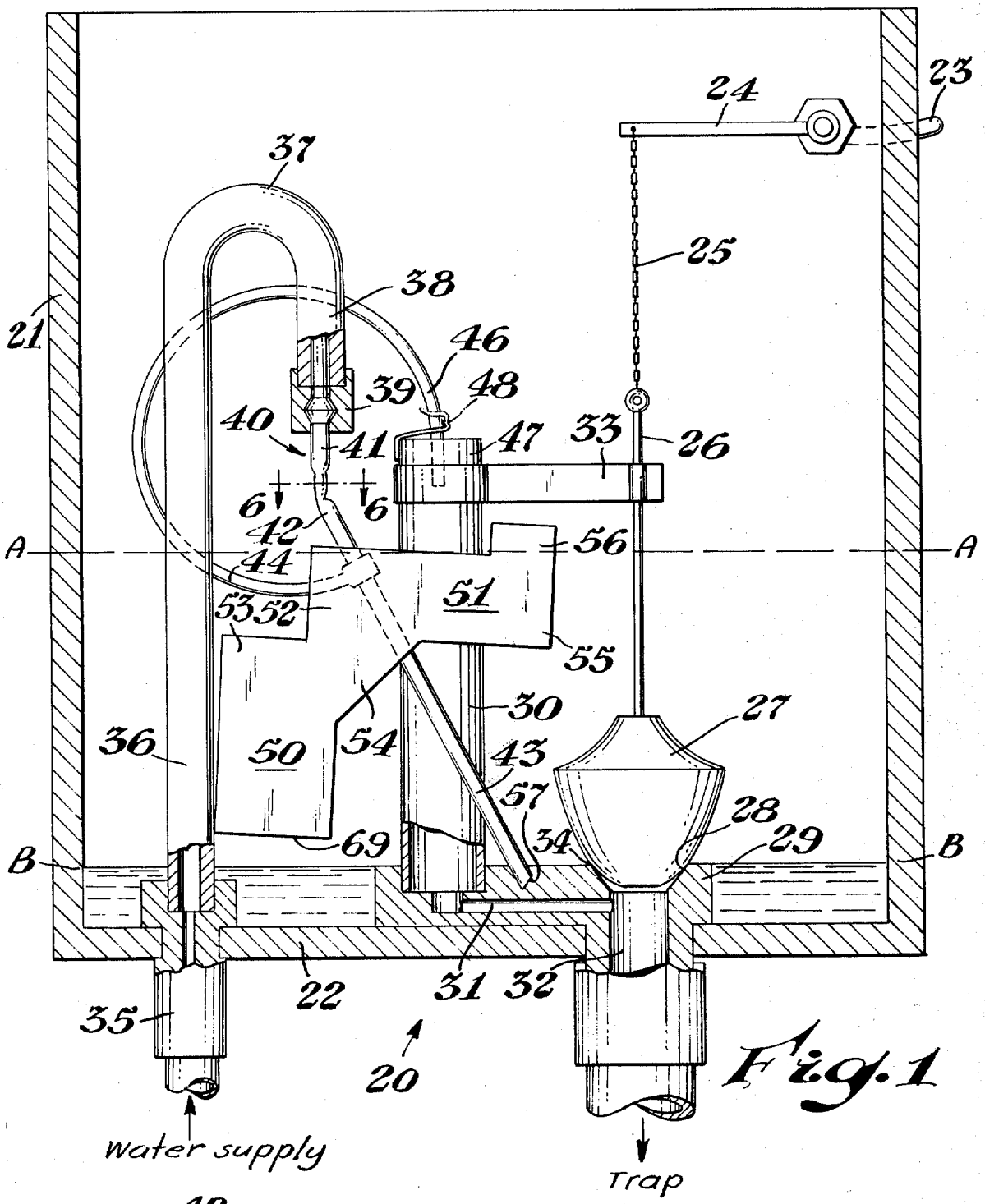
FIG. 1 is a view of a water closet in vertical section showing the apparatus of the invention partly in full and partly broken away and in section.

Referring now to FIG. 1 of the drawings, the apparatus of the invention is shown in the context of a water closet, indicated generally by the numeral 20, having walls including sidewalls 21 and a bottom wall 22. Water stored in the closet up to a level A—A is drained to an associated toilet bowl (not shown), upon depressing or tripping handle 23, the portion 24 thereof inside the water closet 20 being connected by a chain 25 and a rigid wire or rod 26 to a hollow rubber ball type stopper 27 that seats in a complementary concavity 28 in a drain fitting 29 that extends through the bottom wall 22 and communicates with a short conduit (not shown) that leads directly to the toilet bowl. An overflow pipe 30 is fitted into and mounted into the drain fitting 29 and drains through a small bore or channel 31 therein to the main channel 32 thereof. A guide 33 for the rigid wire 26 is clamped to the overflow pipe 30 at about the midheight thereof and extends over the concavity 28. When the water has drained out of the closet 20, it falls to a residual level indicated by the line B—B, which is flush with the edge or lip 34 of the concavity 28, just as refilling commences.

Water for refilling the water closet 20 is introduced through supply conduit means comprising a supply fitting 35 that extends through the bottom wall 22 of the water closet, has a water supply line (not shown) connected to it externally, and internally has a supply pipe 36 mounted upright therein and communicating therewith. The supply pipe 36 extends upwardly approximately vertically from the bottom wall 22 and terminates in an inverted U-shaped portion 37 having a short downwardly extending arm portion 38 to which is connected, by means of an adapter 39, a delivery tube indicated generally by the numeral 40.

The delivery tube 40 may be made by joining together several pieces of tubing of different character in a combination in which there is essentially a flexible portion to serve as a pinch-valve, but conveniently the delivery tube is readily made of a single piece of elastomeric material, preferably synthetic, which is moderately flexible, but also able to maintain its integrity, and further, is capable of being pinched or crimped and permanently deformed under heat and pressure at the point of flexing where it is desired that flexing occur repetitively in the same manner, i.e., in the same plane.

The delivery tube 40, as shown, consists of a short straight downward portion 41 adjacent the arm portion 38 of the supply pipe 36, a bent, essentially flexible and permanently deformed, i.e., pre-formed moderately flexed and pinched portion 42, the angle of bending in the relaxed or externally unstressed condition when the vessel is empty being about 25° to 35°, and an elongated free end portion 43. The elongated free end portion 43 extends down toward the bottom wall 22 at or adjacent and preferably at least slightly below the residual water level corresponding to line B—B of the drawing. It is also quite essential that the overflow pipe 30, the drain fitting 29, the rubber ball stopper 27 and the rigid wire 26 be positioned away from the arc that the elongated free end portion 43 of the delivery tube 40 must describe when it is swung upward on pivoting at the pinched portion 42.

Figure 5:
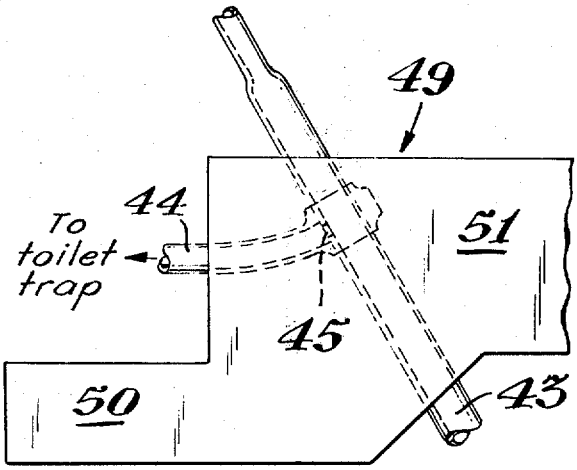
FIG. 5 is a fragmentary view of an enlarged portion of the float and delivery tube of FIG. 1 showing the detail of the side delivery tube for conveying a small stream of water to a trap for the filling thereof during the filling of a water closet.
Figure 9:
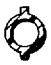
Figure 10:
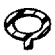
Figure 11:
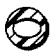

A sidearm delivery tube 44 is attached to the elongated free end portion 43 adjacent to but spaced apart from the deformed and pinched portion 42 and communicates with the bore in the said free end portion 43 which has a small aperture 45 formed through the wall thereof which is more readily seen in the enlarged fragmentary view of FIG. 5. The other end 46 of the sidearm delivery tube extends into the open top end 47 of the overflow pipe 30 and is conveniently held in place, if desired, as by a spring clip 48. After the rubber bulb stopper 27 has seated, after emptying of the water closet and as refilling commences, it is important that water entering the sidearm delivery tube 44 is directed to the overflow pipe 30 whence it drains down into the toilet bowl (not shown) and fills the trap thereof to the normal desired level, since water being delivered from the tip of delivery tube 40 cannot fill the trap after the rubber bulb stopper 27 becomes seated. The aperture 45 is preferably sized according to the water pressure range available and the sizes of the bores of the elongated free end portion 43 and of the sidearm delivery tube 44 are selected in a ratio to provide just an adequate flow of water through sidearm delivery tube 44 to fill the trap during the filling of the water closet.

With a water pressure of about 80 to 100 p.s.i. (gauge), an elongated free end portion bore of about 0.2 inch, and a sidearm delivery tube bore of about 0.125 inch, a typical trap will fill in the time it takes for a water closet to refill to a volume in the range of 3 to 4 gallons.

A very critical aspect of the present apparatus is the float, indicated generally by the numeral 49, especially its overall shape, the relative dimensions or volumes of the different portions thereof and the disposition of the float itself with respect to the delivery tube 40 and a line drawn vertically downward from the downwardly extending arm portion 38 of the supply pipe 36.

The float 49, as indicated, is a specially shaped body having two main elongated body portions 50, 51 of nearly equal volume jointed at about right angles at the mutually attached ends 52, 53 thereof, the end 52 of body portion 51 overlapping about one-fourth to one-third of the face of end 53 of body portion 51, i.e., one-fourth to one-third of the transverse width of body portion 50, to provide for joinder. In addition, the two body portions 50, 51, especially in the case of a float made of cellular or foamed polymeric material, is further braced by a large fillet-like body portion 54 integrally formed therewith within the included angle between body portions 50, 51.

The float may also be described as an L-shaped body with arms of about equal dimensions, but with the corner opposite the included angle of the L being notched out, a rectangular shaped portion being removed, or at least cuts being made transversely to each body portion, to a depth approximately equal to the transverse width of one of the arms. The body portions or arms may have most any shape in section but are most generally square or nearly square in section. In a typical water closet assembly the dimensions of the float made from cellular polymeric material having a density of about 2 pounds per cubic foot is $3\frac{3}{32} \times 1\frac{7}{8} \times 1\frac{3}{4}$ inches for the first body portion and $3\frac{7}{8} \times 1\frac{3}{8} \times 1\frac{3}{4}$ inches for the second body portion with a side projection measuring $1 \times \frac{1}{2}$ inch, and the fillet being in the form of an isosceles triangle having the side lengths $1\frac{1}{4}$, $1\frac{1}{4}$ and $1\frac{7}{8}$ inches.

The elongated body portion 51 is attached to the elongated free end portion 43 of delivery tube 40 adjacent to but spaced apart from the pre-formed moderately flexed or bent portion 42, as by being formed around the delivery tube, or, in any other suitable manner, e.g., by cementing or by fastening with a clip, so as to hold the elongated body portion 51 nearly horizontal but with the free end 55 thereof dipped slightly down from the horizontal when the delivery tube portion 43 extends down at an angle of about 25° to 35° from the vertical. The point of attachment is always between the mid-length of the delivery tube portion 43 and the moderately flexed or bent portion 42.

As a further critical and essential part of the invention, the float is provided with a small protruding body portion 56 at or adjacent the free end 55 of the elongated body portion 51, the protruding body portion 56 extending from the elongated body portion 51 in the same plane as both body portions 50, 51 and away from the side to which elongated body portion 50 is attached. The protruding portion 56 has a volume about one-eighth to about one-twelfth, but preferably about one-ninth to about one-eleventh, and most preferably one-tenth, that of the elongated body portion 51 and is one of the features that is essential to obtaining eccentric action in the valve shut-off operation in closing the pinch-valve of the apparatus.

As further critical and essential aspects of the invention, the radius of the U-shaped arm portion 37 of the supply pipe 36 and the dimensions of the elongated body portion 50 of the float 49 are mutually interdependently selected so that the float, as it hangs in air supported by the externally unstressed and only moderately flexed or bent delivery tube 40, when the water closet stands drained, is positioned with the downwardly extending elongated body portion 50 immediately adjacent or bearing against the supply pipe 36, which briefly serves as stop means during each cycle, the now approximately vertical longitudinal axis of the first body portion 50 as it emerges from the lower end thereof extending to a point about midway along a horizontal line between the supply pipe 36 and a line extending vertically downward from the adapter 39 and the short straight portion 41 of the delivery tube 40, these being attached to the downwardly extending aetrm portion 38 of the inverted U-shaped portion 37 of the supply pipe 36. It is essential that the said longitudinal axis, as it emerges from the lower end of the first body portion 50, is between the adjacent supply pipe 36 and said vertically drawn line and that from about 85 to 95 percent, and more preferably about 90 percent, of the lower end face 69 of the first body portion 50 lies between said vertical line and said supply pipe 36 in order to get the appropriately sufficient vector force to hold the float in a locked position during most of the filling of the vessel.

Figure 2:
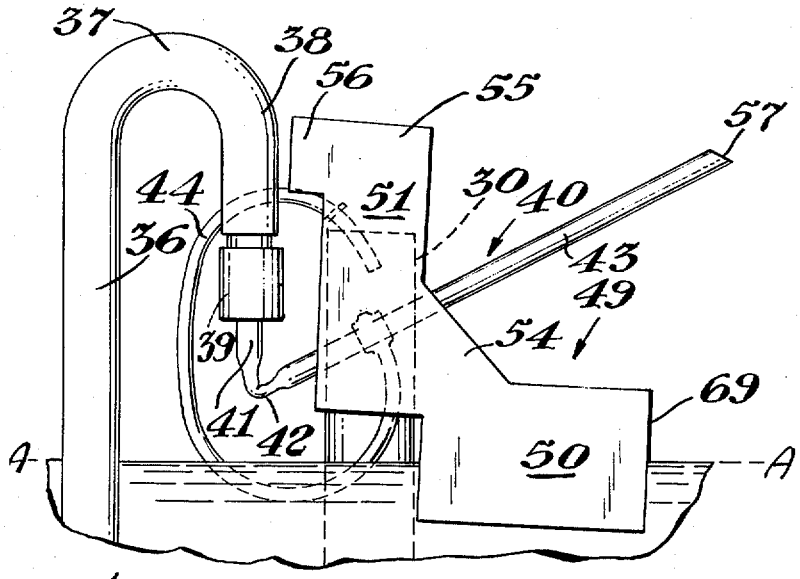
FIG. 2 is a fragmentary portion of a view in front elevation of the apparatus of FIG. 1 showing the position of the float and delivery tube when the water closet is filled.

The disposition of the float 49 and the delivery tube 40 when the water closet is filled to the level denoted by the line A—A, the normal "filled" level, is illustrated in FIG. 2. There the float 49 is seen to be buoyed up by the water with the first body portion 50 partly submerged and with the second body portion 51 adjacent or against the arm 38 of the supply pipe 36. It is essential that the delivery tube 40 assuredly pinches off the flow of liquid upon being flexed through an angle no larger than that permitted upon moving the second body portion 51 in an arc up towards arm 38.

Figure 3:
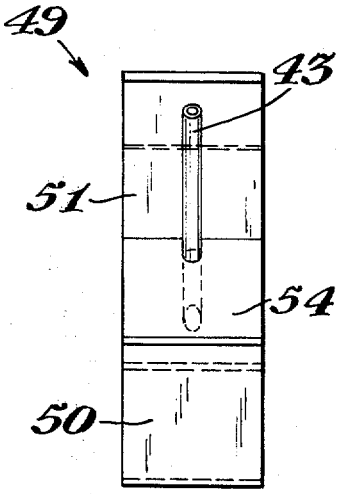
FIG. 3 is a view in side elevation of the float shown in FIG. 2.
Figure 12:
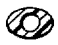

A view of the float 49 in side elevation is shown in FIG. 3, illustrating principally the right rectangular nature of the elongated body portions 50, 51, though these may also be cylindrical in section, if desired, or any other reasonable solid and strong body shape having the requisite volume for buoyancy.

The moderately bent, by pre-forming, portion 42 of the delivery tube 40, as seen in FIG. 2, is flexed by the action of the float 49 through a substantial angle, generally, about 90°, but always sufficient to positively shut off the flow of water through the delivery tube 40 at the bent pinched portion 42. Preferably the delivery tube is so-formed that bending it to form an included angle of about 60° to 75° completely shuts off the flow of water.

Figures 6, 7, 8:
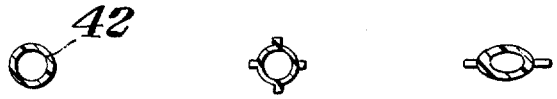
FIG. 6 is a view in section along the line 6—6 of FIG. 1 showing the nature of the flexible portion of the delivery tube.
FIGS. 7–12 are sectional views similar to FIG. 6 showing additional embodiments of the flexible portion of the delivery tube with various features such as ribs and oval bores.

A view in section of the flexible bent pinched portion 42 of the delivery tube 40 taken along the line 6—6 of FIG. 1 is shown in FIG. 6, illustrating a tube of uniform wall thickness and circular in section. On heating and permanently deforming the flexible tubing to have a permanent partial restriction, the tubing is caused to bend most readily through substantially the same plane, when flexed repeatedly, with a good degree of reliability. If this is found to be a problem with any particular materials used to form the delivery tube 40, then tubes appearing in section like those of FIGS. 7–12 may be used in place of the tube of FIG. 6 as the delivery tube of FIGS. 1–5. FIGS. 7–12 each show a view in section rather similar to FIG. 6, i.e., a section through the portion of delivery tube 40 that flexes and pinches shut to control liquid flow therethrough. By the use of tubes having one or more external ribs or longitudinally thickened wall sections, as illustrated in FIGS. 7–12, more reliable and certain flexing through a given plane is obtained consistently with some elastomeric materials.

Figure 13:
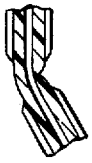
FIG. 13 is a fragmentary view in front elevation of a portion of flexible tube on either side of the point of flexing showing a ribbed tube with the ribs interrupted at the point of flexing.

The fragmentary view of FIG. 13 shows a portion of pinched bent tube which has external ribs front and back with respect to the direction of flexing and which may be used as the pinched bent portion 42 of FIG. 1. The tube of FIG. 13 flexes easily since the ribs are removed or absent immediately at and adjacent the preformed pinched constriction and any such tube with one or more ribs is preferably so modified at the constriction point.

Referring again to FIGS. 1 and 2, the distal end or tip 57 of the elongated free end portion 43 of the delivery tube 40 may be simply cut off square, but it is preferred for water closet apparatus that the tip 57 is bevelled, with the longest part closest to the elongated first body portion 50 of the float 49 so that liquid issuing from the delivery tube is directed almost diametrically away from the first body portion 50.

The elongated free end portion 43 of the delivery tube 40 extends between the body portions 50, 51 of the float and substantially in the same plane therewith and at an angle of at least about 15° to body portion 50 and an angle of at least about 30° to body portion 51, but more generally is about midway the two body portions at an angle of about 25° to 35° to body portion 50.

The float may be made of any strong, but very light weight material with a density in the range of about 0.5 to about 5 pounds per cubic foot, but more preferably about 1 to 3 pounds per cubic foot. The material should be resistant to attack by the liquid filling the vessel being controlled, and should not soak up such liquid and lose its buoyancy, nor disintegrate. While it is possible to construct a suitable float in the form of a hollow body with, e.g., a thin metal, glass or plastic shell or envelope, or even as two hollow bodies joined together, it is simplest and best to make the float of foamed or expanded polymeric or vitreous, i.e., glass or ceramic material, having substantially all closed cells. Suitable material for making the float for use in most aqueous liquids include foamed or expanded polystyrene, polyurethane, and, polylower alkylene formed from low molecular weight monomer having a carbon chain length not exceeding four carbon atoms and including polyethylene, polypropylene and polybutylene. More suitable for use with active organic solvents such as acetone, ether, petroleum ether, or benzene, are foamed or expanded polyhalogenated polymers such as chloropolyethylene, or foamed or expanded ceramic or vitreous materials of the requisite low density. The polymeric materials are convenient to use since they are usually supplied in dense pelletized or bead form with material already incorporated therein that causes the polymer to expand on being heated. Such materials are readily heated, expanded, bonded and formed under compression around the delivery tube 40, generally eliminating the problem of attaching or bonding the float to the delivery tube so that it will not slide up or down the tube and alter the liquid level at which the device shuts off the flow of filling liquid, or slide down the tube and fall off while the vessel is empty.

The delivery tube 40 is most conveniently made of a single piece of natural or synthetic elastomeric material, for example, a polymeric material usually formulated with an anti-oxidant and a plasticizer and having sufficient integrity to hold a tubular form indefinitely while being flexible enough not to crack or break on being flexed many, many times. Partially vulcanized natural rubber is usable but more superior service is had from polychloroprene, polychloroisopentadiene, polypropylene, butyl rubber and styrene-butadiene copolymer. The material of choice is the well known saran rubber consisting essentially of the copolymer of vinylidene chloride and acrylonitrile copolymerized in proportions of about 85 percent and 15 percent, respectively, as more fully described in U.S. Pat. No. 2,523,235. Other related compositions are described in U.S. Pat. Nos. 2,614,092 and 2,996,843. Another suitable elastomer is butadiene-acrylonitrile copolymer. Each of these is at least partially thermosetting and advantage of this property is taken to crimp the tube at the point at which bending is to take place each time the vessel fills and the float operates to shut off the flow of liquid. Generally, the crimp in the tube serves to make shut off more precise and abrupt, makes shut off occur with less bending of the tube, i.e., after the free end has swung through a smaller arc, and, as indicated above, tends to make the part that flexes bend repeatedly through the same plane as if a memory had been imparted to it.

Figure 14:
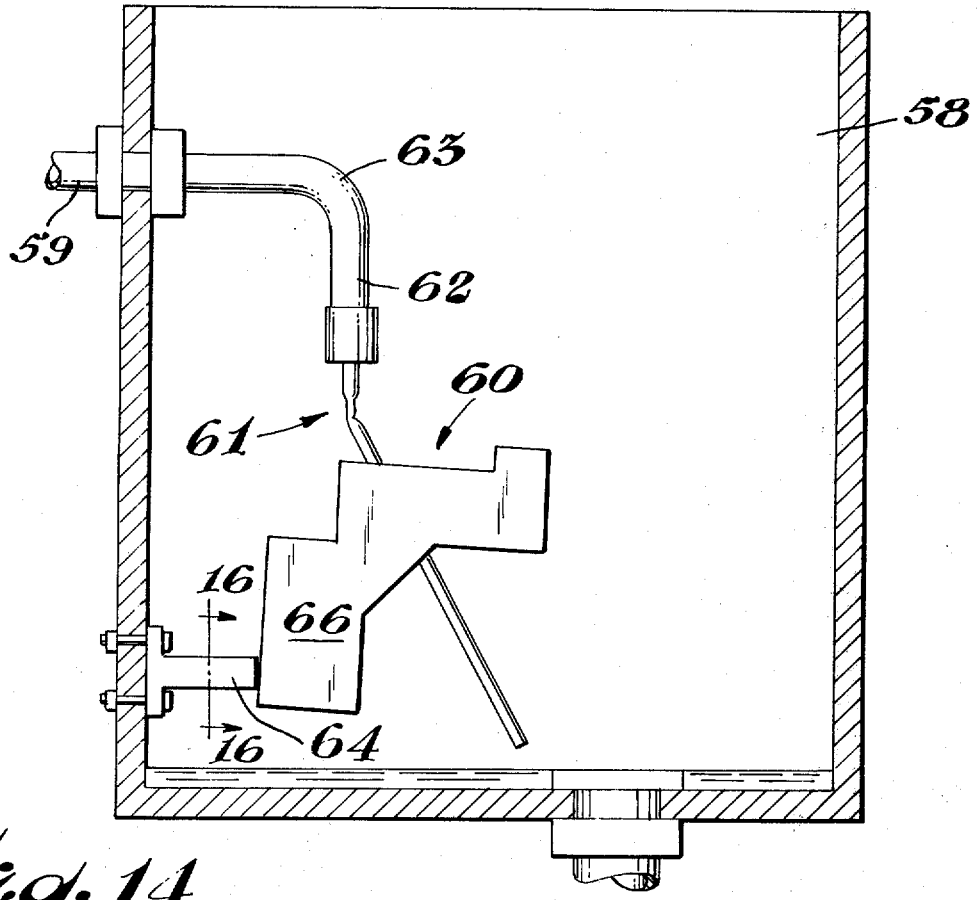
FIG. 14 is a view of a liquid-holding vessel in vertical section showing the apparatus of the invention partly in full and partly in section, the embodiment differing from that of FIG. 1, particularly in the conduit extending through the side wall, in stop means being provided other than the conduit, and in there being no drain trap to be filled while the vessel is filling.
Figure 15:
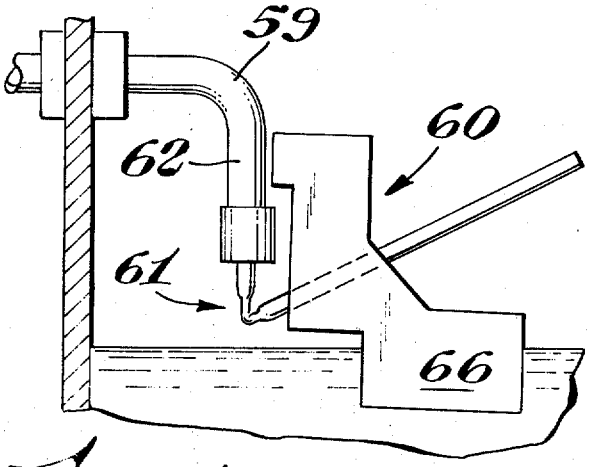
FIG. 15 is a fragmentary portion in front elevation of the apparatus of FIG. 14 showing the position of the float and delivery tube when the vessel is filled with liquid.
Figure 16:
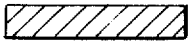
FIG. 16 is a view in section along line 16—16 of FIG. 14 showing the nature of the stop means.

In another embodiment of the apparatus of the invention illustrated in FIGS. 14 and 15, eccentric float control means is used to control the filling of a vessel 58 in which the supply conduit 59 extends through the sidewall of the vessel. If desired, the supply conduit may simply extend over the sidewall of the vessel, rather than through it, and may be supported externally of the vessel. The float 60 is mounted on a delivery tube generally indicated by the numeral 61. The delivery tube 61 is attached to, communicates with and is dependent from the downwardly extending arm 62 of the elbow 63 of the supply conduit 59. As may be seen from studying FIGS. 14 and 15, the mechanism works in the same manner as that shown in FIGS. 1 and 2 except that there is no need for a sidearm delivery tube where there is no trap to be refilled. In addition, in the absence of an upstanding supply conduit extending up from the bottom wall of the vessel, it is necessary to provide other stop means 64 against which the float 60 bears after it swings down during emptying of the vessel and against which it must bear during most of the stage of filling the vessel. On the other hand, upon positioning the downward extending arm portion 62 of the supply conduit 59 an appropriate distance from the sidewall of the vessel and inside the vessel, such sidewall may be utilized as the stop means. The stop means 64 is located nearly vertically below the said downwardly extending arm 62 of the supply conduit 59 and in the plane through which the float swings when the delivery tube flexes at shut off. The stop means 64 is attached to the sidewall of the vessel by any suitable means such as welding or bolting to the sidewall itself and the stop means may have any suitable shape in section so long as it contacts the float as shown in FIG. 14 and stops the float 60 at the point shown. As may be seen from FIG. 16, the stop means 64 represented here is rectangular in section.

Figure 17:
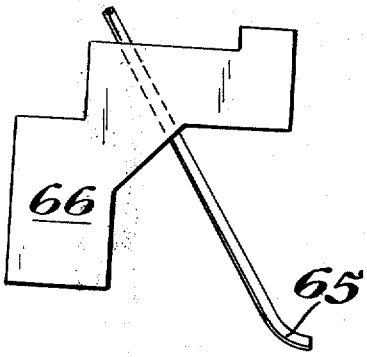
FIG. 17 is a view in front elevation of a float similar to that shown in FIG. 1 with a portion of delivery tube associated therewith, the delivery end of the tube being curved to accentuate the jet effect during filling of the vessel.

The tip of the delivery tubes, as illustrated in the drawings, may be square cut or bevelled. As illustrated in FIG. 17, the tip 65 may also be slightly bent or curved so that the opening faces away from the first body portion 66 of the float, such first body portion being the part of the float which bears against the supply conduit or other stop means. Thus, liquid issuing from the delivery tube is directed in such manner that the first body portion 66 is pushed against such stop means as an essential part of keeping the pinch-valve open until the subsequent eccentric or abrupt shut off of the mechanism of the invention.

In a moderate size vessel such as a water closet, the tip of the delivery tube desirably extends close to or just under the residual liquid level when the vessel is drained so that on commencing refilling the jet action is promptly enhanced by the liquid issuing from the tip pushing against surrounding liquid in the vessel. In larger vessels it is adequate to have the tip extend far enough down to bring about this reaction in a timely manner to lock the float in the filling position as the liquid level rises.

Figure 4:
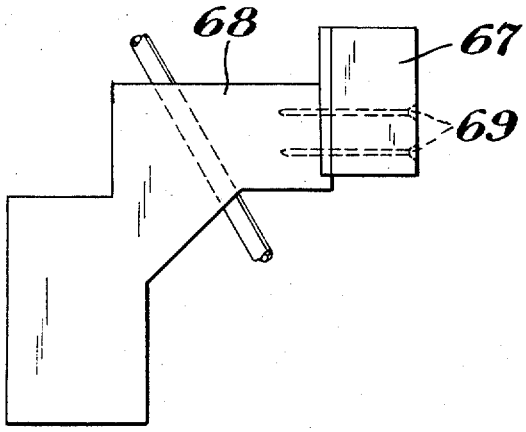
FIG. 4 is a view in front elevation of a float similar to that shown in FIG. 1, the embodiment illustrating a side extension whose relative position to the remainder of the float is readily adjusted.

If desired, the float used in the present apparatus may be constructed similar to that shown in FIG. 4 in which an end portion 67 of elongated body portion 68 corresponding to the second body portion 51 of the float of FIGS. 1 and 2, is a separate piece which is attached by pins 69 which are readily pulled out and the relative positions, transversely, of body portion 68 to the end portion 67 adjusted by reattaching the end portion 67 with the pins after sliding the end portion transversely to the body portion, i.e., up or down with respect to the body portion when the mechanism is in the filling position when the vessel is empty and body portion 68 extends about horizontally. Such adjustments change the characteristics of the action of the float and determine when the abrupt shutting off action of the mechanism will take place, thus determining the final or filled liquid level. This permits fine adjustments where needed, facilitating less expensive installation and more satisfactory performance.

In carrying out eccentric float controlled vessel filling operations according to the method of the invention using the apparatus of the drawings, it is essential during the filling of the vessel after rising liquid has reached the level of the depending first body portion of the float means, to provide a first vector force in a horizontal direction consisting of the combined effect of the buoyancy of the first body portion and the jet action of liquid issuing from the distal end of the delivery tube, the vector force being sufficient to temporarily fixedly hold the first body portion locked against a stop with the free ends of the body portions of the float disposed one on either side of a vertical line drawn down from the downwardly extending arm of the supply conduit, and to maintain the float and first body portion thereof in such position throughout the filling of the vessel. Then when the vessel is substantially filled to the pre-determined filled level, it is essential to provide sufficient second vector force, in the form of buoyancy of the second body portion, in a horizontal direction opposed to said first vector force to overcome the same and to pivotally move the float means, including the first body portion, out of the temporarily locked position, to a sufficient extent that the lower end of the first body portion is moved past said vertical line, causing the buoyancy of the first body portion to come into play on the said opposite side of the vertical line whereby the buoyancy of the first body portion is combined with that of the second body portion to provide a vertically directed vector force great enough to eccentrically flex the associated delivery tube arcuately upwardly to form an included angle less than about 90° and sufficiently small to pinch shut the flexible portion of the delivery tube, abruptly shutting off the flow of liquid therethrough.

An advantage of the present invention is that small particulate matter passing through the liquid supply line seldom plugs the pinch-valve, while such material often plugs or partially obstructs the ordinary metal valves used for vessel filling control heretofore.

I claim:

1. In combination with a vessel to be controllably filled with a liquid to a pre-determined filled level, said vessel having defining walls and controllable liquid emptying means, the float-controlled pinch-valve vessel filling device mounted therein, which comprises:

a liquid supply conduit positioned to deliver liquid inside the vessel, said supply conduit having a terminal portion positioned above the pre-determined filled level and extending approximately vertically downward towards said filled level;

delivery tube means having a first end portion coupled to the terminal end of said supply conduit and communicating therewith, and a second dependent portion terminating in a free distal end that is directed downwardly when the vessel is empty, and the delivery tube means having a third portion co-joining the first and second portions and being flexible and adapted to prevent liquid flow therethrough by its internal cross-section becoming substantially zero when flexed to form an included angle less than about 90° between the first and second portions;

buoyant float means associated with and attached to said delivery tube means between the point of flexing, in the third portion, and the mid-length of the second portion of the delivery tube means;

and stop means restricting the pivotal movement of the buoyant float means and associated delivery tube means about the point of flexing when the delivery tube means depends downwardly when the vessel is in a substantially empty condition prior to filling and the associated float and delivery tube means are in filling position;

said buoyant float means being buoyant in, substantially impervious to, and substantially unattacked by, said liquid;

said buoyant float means being shaped with first and second slightly elongated body portions each having a longitudinal axis and each having an end co-joined at an angle of about 90° between said axes with the end of the second body portion overlapping the end of the first body portion by about one-fourth to one-third the width of said first body portion, said second body portion having a side extension adjacent its free end, said side extension projecting from the side opposite the side to which the first body portion is joined, and said second body portion having a buoyancy at least about as great as said first body portion;

said delivery tube means being substantially coplanar therewith and attached to said buoyant float means and extending along a line between the body portions at an angle of between at least 15° to the longitudinal axis of the first body portion and at least 30° to the longitudinal axis of the second body portion and at a point along the delivery tube means whereby upon such tube means depending downwardly, the longitudinal axis of the second body portion is at approximately the height of the predetermined filled level;

and said stop means being positioned relative to the combination of factors (1) the position of the vertically downward portion of the supply conduit, (2) the dimensions of the first body portion of the buoyant float means, and (3) the angle between the second portion of the delivery tube means to the buoyant float means, whereby in the assembly, prior to filling the vessel when the second portion of the delivery tube means depends downwardly and the buoyant float means is pushed substantially horizontally against the stop means by initial flow of filling liquid and by buoyancy of the first body portion, the longitudinal axis of said first body portion extends, at the bottom end thereof, away from a line drawn vertically downward from said downwardly extending portion of the supply conduit and toward said stop means, the stop means being spaced a distance equal to from about 85 to 95 percent of the thickness of the first body portion from the line vertically drawn, while the second portion of the delivery tube means diverges away from said stop means and depends at an angle of from about 10° to about 55° with respect to said line drawn vertically.

2. The combination of claim 1 wherein the vessel is a water closet.

3. The combination of claim 2 wherein the water closet is adapted to flush an associated toilet bowl having a trap and a flexible sidestream delivery tube is joined below and adjacent the flexible portion of the delivery tube means and is in communication therewith as well as with the trap of the said toilet bowl.

4. The combination of claim 1 wherein the liquid supply conduit means extends through the bottom wall of the vessel and is positioned and aligned with respect to said vertically drawn line so as to serve as, and is, the stop means.

5. The combination of claim 1 wherein the relative dimensions of the first body portion of the buoyant float means and the distance separation of the stop means from the said line drawn vertically downward and the angle of mounting of the buoyant float means on the second portion of the delivery tube means all co-act to provide an angle of about 20° to 40° between said second portion and said line drawn vertically downward when the buoyant float means is positioned against the stop means.

6. The combination of claim 5 wherein the second portion of the delivery tube means is held at an angle of about 30° relative to said vertically drawn line.

7. The combination of claim 1 wherein the distal end portion of the delivery tube means terminates in a curved tip with a liquid delivery opening that faces away from said stop means when the float means and delivery tube means are in the filling position.

8. The combination of claim 1 wherein the flexible portion of said delivery tube means is pre-formed moderately flexed to repeatedly bend readily at the same point and through substantially the same plane.

9. The combination of claim 1 wherein the flexible portion of said delivery tube means is a tube formed with at least one longitudinal external rib portion.

10. The combination of claim 9 wherein the at least one rib is formed substantially in the plane of bending the flexible portion and is interrupted and absent at about the point of bending said flexible portion.

11. The combination as in claim 1 wherein the flexible portion of said delivery tube means is elliptical in section.

12. The combination of claim 1 wherein the vessel has a pre-determined residual liquid level and the distal end of said delivery tube means extends below said liquid level when the vessel is empty and the float means and delivery tube means combination have pivoted to the filling position.

13. The combination of claim 1 wherein the buoyant float means is formed of a foamed-polymeric material with substantially all closed cells, the density of said foamed polymeric material benig about 0.5 to about 5 pounds per cubic foot.

14. The combination of claim 13 wherein the second portion of the delivery tube means extends through the second body portion of the buoyant float means.

15. The combination of claim 13 wherein the buoyant float means is formed of at least two separate and distinct body members fastened together and the positions of each are adjustable relative to the other.

16. The combination of claim 15 in which the side extension of the second body portion of the float means is formed as a separate part and the position thereof relative to the said second body portion is adjustable.

17. The combination of claim 13 wherein the polymeric material is polystyrene.

18. The combination of claim 13 wherein the polymeric material is polyurethane.

19. The combination of claim 13 wherein the polymeric material is poly-lower alkylene formed from low molecular weight monomer having a carbon chain length not exceeding four carbons.

20. The combination of claim 1 wherein the buoyant float means is formed as a hollow body with a lightweight defining enveloped.

21. The combination of claim 1 wherein the buoyant float means is formed as at least two co-joined hollow body members each with a lightweight defining envelope.

22. An eccentric acting float-controlled pinch-valve device for controlling the filling of a vessel with a liquid to a predetermined level, which comprises:

delivery tube means having first and second end portions and a co-joining third portion, the first portion being adapted to depend vertically downward from a liquid supply conduit to which it is communicatively coupled, the second portion terminating in a free distal end, and the third portion co-joining the first and second portions and being flexible and formed of elastomeric material and adapted to prevent liquid flow therethrough by its internal cross-section becoming substantially zero when said third portion is flexed to form an included angle less than about 90° between the first and second portions, said third portion being pre-formed to a moderately flexed included angle of about 25° to about 35° in the relaxed and unstressed condition;

and buoyant float means associated with and attached to said delivery tube means, said buoyant float means having first and second slightly elongated body portion each having a longitudinal axis and each having an end co-joined at an angle of about 90° between said axes with the end of the second body portion overlapping the end of the first body portion by about one-fourth to one-third the width of said first body portion, said second body portion having a side extension adjacent its free end, said side extension projecting from the side opposite the side to which the first body portion is joined, and said second body portion having a buoyancy at least about as great as said first body portion;

said buoyant flat means being buoyant in, substantially impervious to, and substantially unattacked chemically by, the liquid in which it is to be used;

the zone of association with respect to the delivery tube means being the second portion between the mid-length thereof and the third portion, and with respect to the buoyant float means being the second body portion adjacent the co-joined ends of the body portions;

the second portion of said delivery tube means being substantially co-planar with the attached buoyant float means and extending from said second body portion adjacent said co-joined ends along a line through the included angle of about 90° between said body portions at an angle of between at least 15° to the longitudinal axis of the first body portion and at least 30° to the longitudinal axis of the second body portion;

said buoyant float means, when the pinch-valve device is freely suspended in air by the first portion of the delivery tube means being attached to a vertically downwardly extending supply conduit, having such a disposition that the first body portion extends approximately vertically downward while the second body portion extends approximately horizontally.

23. The device as in claim 22 in which the buoyant float means is formed of a cellular polymeric material with substantially all closed cells and a strengthening fillet is formed within the included angle between the body portions.

24. The process of controllably filling a vessel with a liquid to a pre-determined level utilizing a float-controlled pinch-valve filling device, which comprises:

delivering the liquid to the interior of the vessel through a liquid supply conduit having a terminal portion thereof positioned at a point substantially above the predetermined liquid level and the terminal portion extending approximately vertically downward toward the liquid level;

further conveying the liquid down into the vessel through delivery tube means having the end of a first portion thereof coupled to the terminal end of the supply conduit, a second portion terminating as the distal end of the delivery tube means, and a third portion that is flexible and co-joins the first and second portions, said third portion being adapted to repeatedly bend at the same point and in the same plane, said distal end extending downwardly when the vessel is substantially empty;

providing buoyant float means associated with and attached to the delivery tube means at a point between the mid-length of the second portion and the end co-joined with the third portion, said float means having first and second body portions each having a longitudinal axis and each having an end co-joined at an angle of about 90° between said axes with the end of the second body portion overlapping the end of the first body portion by about one-fourth to one-third the width of said first body portion, said second body portion having a side extension adjacent its free end, said side extension projecting from the side opposite the side to which the first body portion is joined, the filling device, when the vessel is empty, being disposed in such a manner that the first body portion of the float means depends approximately vertically downward and the second body portion approximately horizontally and the free ends of each body portion lying on either side of a line drawn vertically downward from the terminal end of said supply conduit;

during the filling of the vessel after rising liquid therein has reached the level of the depending said first body portion of the float means, providing a first vector force in a horizontal direction consisting of the combined effect of the buoyancy of the first body portion and the jet action of liquid issuing from the distal end of the delivery tube means, said vector force being sufficient to temporarily fixedly hold the first body portion locked against a stop with said free ends of said body portions disposed with one end on either side of said vertical line and to maintain the first body portion in such position substantially throughout the filling of the vessel;

and when the vessel is substantially filled to the predetermined filled level, providing sufficient second vector force, in the form of buoyancy of the second body portion, in a horizontal direction opposed to said first vector force to overcome the same and to pivotally move the float means, including the first body portion, out of the temporarily locked position, to a sufficient extent to cause the buoyancy of the first body portion to exert a force on the opposite side of the said vertical line from the position taken by said first body portion when in the locked position whereby the buoyancy of the first body portion is combined with that of the second body portion to provide a vertically directed vector force great enough to eccentrically flex the associated delivery tube means arcuately upwardly to form an included angle less than about 90° and sufficiently small to pinch shut the flexible portion of the delivery tube means abruptly shutting off the flow of liquid therethrough.

*25. In a float-controlled, non-metallic, pinch-valve vessel filling assembly having a delivery tube with a flexible portion formed of elastomeric material and serving as the pinch-valve, and a float associated therewith the delivery tube, the improvement which comprises:*

*said flexible portion of the delivery tube being a piece of elastomeric tubing having a permanent partial restriction, whereby the flexible portion tends to flex, when bent repetitively, in the same plane.*

*26. The improvement as in claim 25 in which the permanent partial restriction is sufficient to cause positive shut off of the flow of liquid through the delivery tube upon the delivery tube being bent, at the permanent partial restriction, through an angle of about 90 degrees.*

*27. The improvement as in claim 25 in which the permanent partial restriction is sufficient to cause positive shut off of the flow of liquid through the delivery tube upon the delivery tube being bent, at the permanent partial restriction, through an angle in the range of about 60 to 75 degrees.*

*28. The improvement as in claim 25 in which the flexible portion is formed with at least one longitudinal rib thereby to assure flexing in the same plane.*

*29. The improvement as in claim 25 in which the flexible portion is formed with at least one longitudinal thickened wall portion thereby to assure flexing in the same plane.*

*30. The improvement as in claim 25 in which the flexible portion of the delivery tube is formed of an elastomeric material selected from the group consisting of partially vulcanized rubber, polychloroprene, polyisopentadiene, polypropylene, butyl rubber, styrene-butadiene copolymer, copolymer of vinylidene chloride and acrylonitrile, and copolymer of butadienes and acrylonitrile.*

*31. The improvement as in claim 30 in which the elastomeric material is polypropylene or the copolymer of vinylidene chloride and acrylonitrile.*

References Cited

The following references, cited by the Examiner, are of record in the patented file of this patent or the original patent.

UNITED STATES PATENTS

| | | | |
|---|---|---|---|
| 1,010,562 | 12/1911 | Woodward | 137—451 |
| 2,274,678 | 3/1942 | Eliason | 137—409 X |
| 2,831,497 | 4/1958 | Skerritt | 137—451 X |
| 3,598,288 | 8/1971 | Posgate | 251—4 |

MARTIN P. SCHWADRON, Primary Examiner

D. R. MATTHEWS, Assistant Examiner

U.S. Cl. X.R.

137—416, 451